(12) United States Patent
Maguire et al.

(10) Patent No.: US 8,323,818 B2
(45) Date of Patent: Dec. 4, 2012

(54) BATTERY COOLING

(75) Inventors: Patrick Daniel Maguire, Ann Arbor, MI (US); Sarav Paramasivam, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 33 days.

(21) Appl. No.: 12/731,528

(22) Filed: Mar. 25, 2010

(65) Prior Publication Data

US 2011/0177374 A1   Jul. 21, 2011

(51) Int. Cl.
*H01M 10/50* (2006.01)
*H01M 2/00* (2006.01)

(52) U.S. Cl. ........................................ 429/120; 429/148
(58) Field of Classification Search ................... 429/148, 429/120
See application file for complete search history.

(56) References Cited

U.S. PATENT DOCUMENTS

| | | | |
|---|---|---|---|
| 6,312,851 B1 | 11/2001 | Fukuda et al. | |
| 6,379,837 B1 | 4/2002 | Takahashi et al. | |
| 6,579,642 B2 * | 6/2003 | Yamane et al. | 429/120 |
| 6,635,380 B1 | 10/2003 | Shimoda et al. | |
| 6,781,349 B2 | 8/2004 | Kimura et al. | |
| 6,932,651 B2 | 8/2005 | Mita et al. | |
| 7,056,618 B2 | 6/2006 | Hirano et al. | |
| 7,199,553 B2 | 4/2007 | Kimoto | |
| 2001/0046624 A1 | 11/2001 | Goto et al. | |
| 2002/0022159 A1 | 2/2002 | Pierson et al. | |
| 2004/0043287 A1 * | 3/2004 | Bando et al. | 429/156 |
| 2004/0043663 A1 | 3/2004 | Ikeda et al. | |
| 2004/0241544 A1 | 12/2004 | Nakaishi et al. | |
| 2005/0170240 A1 | 8/2005 | German et al. | |
| 2007/0132429 A1 | 6/2007 | Onuki et al. | |
| 2009/0155680 A1 | 6/2009 | Maguire et al. | |
| 2011/0111278 A1 * | 5/2011 | Ghosh et al. | 429/120 |

FOREIGN PATENT DOCUMENTS

| | | |
|---|---|---|
| FR | 2827428 B1 | 1/2003 |
| JP | 09106836 A | 4/1997 |
| WO | 2006/099602 A2 | 9/2006 |

OTHER PUBLICATIONS

Office Action mailed Jun. 23, 2011 in U.S. Appl. No. 12/731,554, filed Mar. 25, 2010, 20 pgs.
Office Action mailed Sep. 27, 2011 in U.S. Appl. No. 12/731,496, filed Mar. 25, 2010, 16 pgs.
Office Action mailed Feb. 14, 2012 in U.S. Appl. No. 12/731,554, filed Mar. 25, 2010, 24 pgs.
Final Office Action mailed Jun. 4, 2012 in U.S. Appl. No. 12/731,496, filed Mar. 25, 2010, 18 pgs.

* cited by examiner

*Primary Examiner* — Helen O Conley
(74) *Attorney, Agent, or Firm* — David B. Kelley; Brooks Kushman P.C.

(57) ABSTRACT

An end-to-end cell connection system for a battery assembly uses a conductive interconnector with an inner portion welded to an end of one cell, a standoff portion contiguous with the ring portion, tabs extending from the standoff portion, with the tabs welded to an end of another cell. By placing an insulator between the interconnector and the one cell, an electrical short is prevented in the event that a longitudinally coupled cell group is jostled. At the cell connections, there is a recess. To hold the cell group in place, the housing has a tab extending into the recess. The tab is at the center so that any dimensional variations are accommodated on each side of the tab. The interconnector also may include a receptacle for a thermistor to obtain a measure of battery assembly temperature. Diverter ribs may be provided in the housing to distribute flow to all cells.

18 Claims, 8 Drawing Sheets

BATTERY COOLING

BACKGROUND

1. Technical Field

The present disclosure relates to a power supply system or battery system, which can be used in a hybrid electric vehicle.

2. Background Art

A battery for a hybrid electric vehicle may include many cells electrically connected. To attain a battery of a sufficiently high voltage, cells are electrically connected serially. Groups of several cells can be coupled longitudinally and then placed in a housing with groups arranged in parallel compartments. And, although cell groups are physically arranged in a parallel fashion, they may be electrically coupled either in series or in parallel. Groups of individual cells within a housing can be called a brick. A plurality of bricks are arranged in an array and electrically connected via bus bars to provide the desired voltage and current characteristics for the particular application. Such connected plurality of bricks forms a battery.

To avoid shorts among cells within a group due to longitudinal bending within a cell group, it is known to place insulating sleeves over the connection points. Such sleeves increase the diameter of the battery group and thus the compartments within the housing. As the battery includes many cells arranged in an array, any increase in diameter is multiplied and causes the housing to be larger than it might otherwise be.

To ensure a robust connection, the longitudinally-arranged cell groups may be welded together. When cells are combined longitudinally to form a group, any manufacturing variation in length of the cells and any variation in the length of the cell group in forming the joint between cells will result in an overall increase in cell group stackup variation. Bus bars, which are used to electrically connect cell groups, may be forced to bend to accommodate differences in length between connecting cells groups. By forcing the bus bar to bend, the connection may be compromised and harm the integrity of the battery. It is desirable to minimize the amount of stackup tolerance that the bus bar bending accommodates.

During charging and discharging of the battery, energy is generated within the cells. The battery is cooled to maintain the temperature within individual cells below a temperature at which cells are damaged. Typically, temperature sensors are provided at various locations within the battery from which temperature within the cells is estimated. It is important to locate the temperature sensors at locations that provide a good indication of the maximum temperatures experienced within battery cells. Also, it is desirable for the temperature sensors to be located in a position that is readily accessible after much of the assembly of the battery is completed because wires from the temperature sensor may be damaged during assembly.

SUMMARY

To address at least one problem, an end-to-end cell connection system is enclosed which has a conductive interconnector with: an inner ring portion welded to an end of a first cell; a standoff portion contiguous with the inner ring portion; and two tabs extending from the standoff portion. The two tabs are welded to an end of a second cell. A washer-shaped insulator located between the conductive interconnector and the first cell. The insulator has an inside diameter large enough to slide over an exterior surface of the standoff portion. The insulator is fitted over the standoff portion prior to welding the first cell to the conductive interconnector. In some embodiments, the tabs comprise two portions: a first portion which extends outward from the standoff portion in a radial direction and a second portion which extends from the first portion in a direction toward the second cell. The first portion of the tabs is welded to an end cap of the second cell in one alternative. In another embodiment, the second portion of the tabs is welded to a cylindrical casing of the second cell. In yet another alternative, both portions of the tabs are welded to the cell.

By providing an interconnector, the diameter of a cell group, is less than using an insulator sleeve. The insulator can be a snap ring insulator which provides advantages in assembly or a conveniently-shaped disk. By decreasing the overall diameter, size of the battery assembly can be reduced.

In some embodiments, a barrel-style female receptacle is coupled to one of the tabs. The receptacle is configured to accept a temperature sensor such as a thermistor. The temperature sensor is placed proximate the conductive interconnector thereby indicating the temperature of the conductive interconnector. In some embodiments, the thermistor has a clip lock to maintain the thermistor position.

To ensure proper cooling, the battery is aided by a temperature estimate from a temperature sensor. According to an embodiment of the present disclosure, the temperature proximate the interconnector provides a good indicator of the internal temperature of the cells. Thus, one advantage of such embodiment is improved cooling. By providing the receptacle for a thermistor, or other temperature sensor, contiguous with the interconnector, no additional hardware is required. Yet another advantage is that the receptacle may be accessed from outside the brick, i.e., after the brick is assembled and after multiple bricks are connected together to form a battery system. This reduces the potential for breakage of electrical leads from the temperature sensor.

In an alternative to the washer-shaped insulator, the first cell has a cylindrical case and a terminal end crimped onto the cylindrical case to form a crimp joint. A snap insulator ring snaps onto the crimp joint and substantially covers the crimp joint. Additionally, a crimp joint insulator is disposed within the crimp joint to electrically insulate the cylindrical case from the terminal end. The snap insulator ring has the shape of a surface of revolution generated by revolving a substantially C-shaped figure in three-dimensional space about an axis coplanar with the C-shaped figure.

The diameter of the snap insulator ring is approximately equal to the diameter of the crimp joint so that the snap insulator ring can be snapped onto the crimp joint without inadvertently slipping off. In one embodiment, the entirety of the snap insulator ring is disposed on a side of the tabs proximate the first cell.

A first assembly of cells mechanically coupled longitudinally and having a circumferential recess at the coupling forms a first group. A housing is provided that has a first tubular compartment configured to receive the first assembly. The housing with the cells installed into the housing is called a brick. The first compartment has a tab extending inwardly to index with the recess. In one embodiment, the cells of the first assembly are mechanically coupled by welding. In one embodiment, there are four cells in the first assembly, three couplings between the four cells thereby defining three recesses, and the tab indexes with the middle of the three recesses. The brick may also have a second assembly of cells mechanically coupled longitudinally and have a circumferential recess at the coupling. The housing further includes a second tubular compartment configured to receive the second assembly. The second compartment has a tab extending inwardly to index with the recess in the second assembly.

Another embodiment of a brick includes a first assembly of cells coupled longitudinally and a second assembly of cells coupled longitudinally. The cell assemblies define a circumferential recess at each coupling. A housing has first and second tubular compartments to hold the first and second cell assemblies. The compartments have a tab extending inwardly from an interior surface, the tab configured to index with one such recess in a cell assembly. In one embodiment, the tab is located approximately equidistant from ends of the housing. In one alternative, the housing includes first and second shells configured to snap together to allow installation of the cells in the compartments.

The width of the tab is less than the width of the recess to allow the tab to index in to the recess. The housing may be a clam-shell having first and second sections which are configured to receive the first and second assemblies of cells and snap together to retain the assemblies. The first and second sections are prevented from snapping together when the tab is indexed with a cylindrical case of the cell.

A battery assembly includes: a plurality of cell groups, each group comprising a plurality of cells coupled longitudinally, a plurality of cell housings each having at least one cell group within with the cell housings arranged in an array. A pair of indexing tabs extends from an outside surface of each cell housing so that a groove in a cover placed over the array mates with the indexing tabs. The indexing tabs are configured to receive the groove and the groove is V shaped in one embodiment, and rectangular in another embodiment.

The battery assembly also has a first end plate coupled to a first end of the array, the first end being a side of the array adjacent to the cover, and a second end plate coupled to a second end of the array, the second end being opposite to the first end. The first and second end plates define multiple clamping holes and the battery assembly also includes a nut coupled to the cover configured to align with the clamping hole when the array, cover, and end plates are in position to be assembled and a bolt passing through the clamping hole and engaged with the nut. The cover, in some embodiments, further includes a tab extending substantially perpendicularly toward an exterior surface of the cover. The tab defines an alignment hole, and the bolt further passes through the alignment hole. In some alternatives, the tab is proximate the groove and extends from a bottom of the groove to, at most, the top of the cover.

A method to assemble a battery, includes arranging bricks containing cells in an array, the bricks having indexing tabs extending outwardly with the indexing tabs forming a channel when arranged in the array and placing a cover over a first side of the array such that a groove formed in the cover engages into the channel of the indexing tabs. In some embodiments, the cover has a tab extending upwardly roughly perpendicularly from the cover with an alignment hole in the tab. The method further includes placing a first end plate with at least one clamping hold adjacent to a second side of the array with the alignment hole, placing a bolt through the alignment hole and the clamping hole, and tightening a nut onto threads of the bolt.

A housing for cells of a battery assembly, in some embodiments, include: a first tubular compartment having a first axis, a second tubular compartment having a second axis generally parallel with the first axis, a duct disposed between the compartments, and a plurality of diverter ribs disposed in the duct. The diverter ribs configured to direct flow into the compartments. Flow along the duct is generally parallel to the first and second axes. In one alternative, the first tubular compartment receives a first cell assembly, the second tubular compartment receives a second cell assembly, with each of the assemblies made up by a plurality of cells mechanically coupled longitudinally. A first half of the diverter ribs direct flow toward the plurality of cells associated with the first cell assembly and a second half of the diverter ribs direct flow toward the plurality of cells associated with the second cell assembly. The number of diverter ribs directing flow toward the plurality of cells associated with the first cell assembly equals the number of cells in the first cell assembly. The duct has an inlet and the diverter rib closest to the inlet is shorter than diverter ribs farther from the inlet. The diverter ribs provide an approximately equal flow quantity directed toward each cell in the first and second cell assemblies. The duct has an inlet and incoming flow to the duct is roughly parallel with the first and second axes and a direction of flow into the compartments is turned approximately ninety degrees with respect to a direction of the incoming flow.

A brick, which is part of a battery assembly, includes a first group of cylindrical cells coupled longitudinally, a second group of cylindrical cells coupled longitudinally and a housing having: a first tubular compartment into which the first group of cells are placed, a second tubular compartment into which the second group of cells are placed, a duct disposed between the compartments, and diverter ribs disposed in the duct, the diverter ribs configured to direct flow into the compartments. The duct runs approximately parallel with the first and second groups of cells, the duct has an inlet, and incoming flow to the duct is diverted through a turn of about ninety degrees toward the compartments. The first group has four cells, the second group has four cells, and the duct has six diverter ribs with three ribs directing flow into the first tubular compartment and three ribs directing flow into the second tubular compartment.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated and described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations consistent with the present disclosure, e.g., ones in which components are arranged in a slightly different order than shown in the embodiments in the Figures. Those of ordinary skill in the art will recognize that the teachings of the present disclosure may be applied to other applications or implementations.

Figure 1:
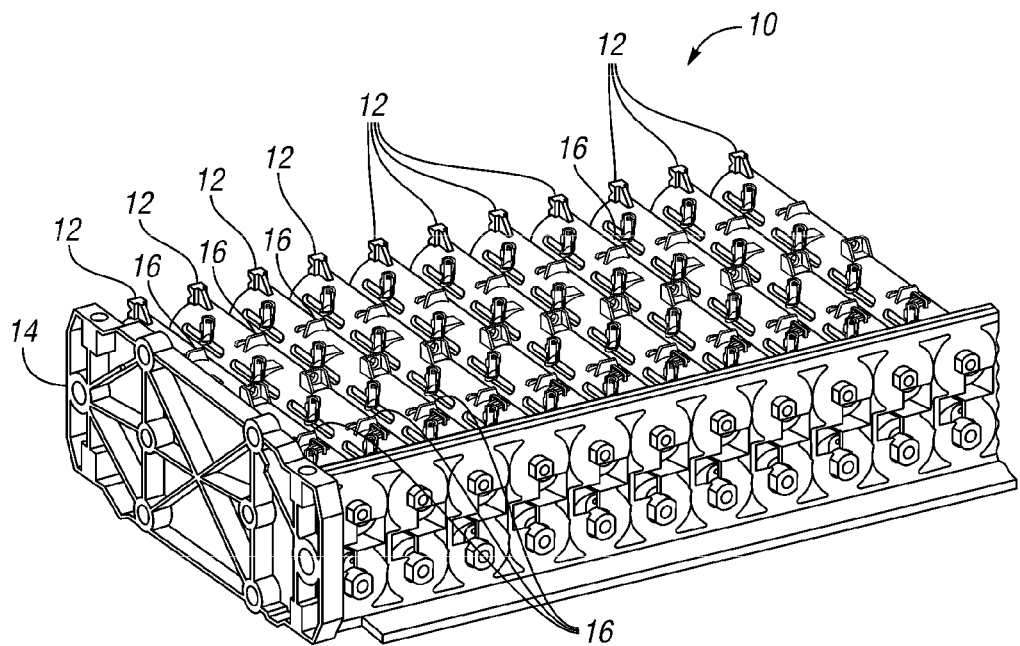
FIG. 1 is an isometric view of a battery partially assembled.
Figure 2:
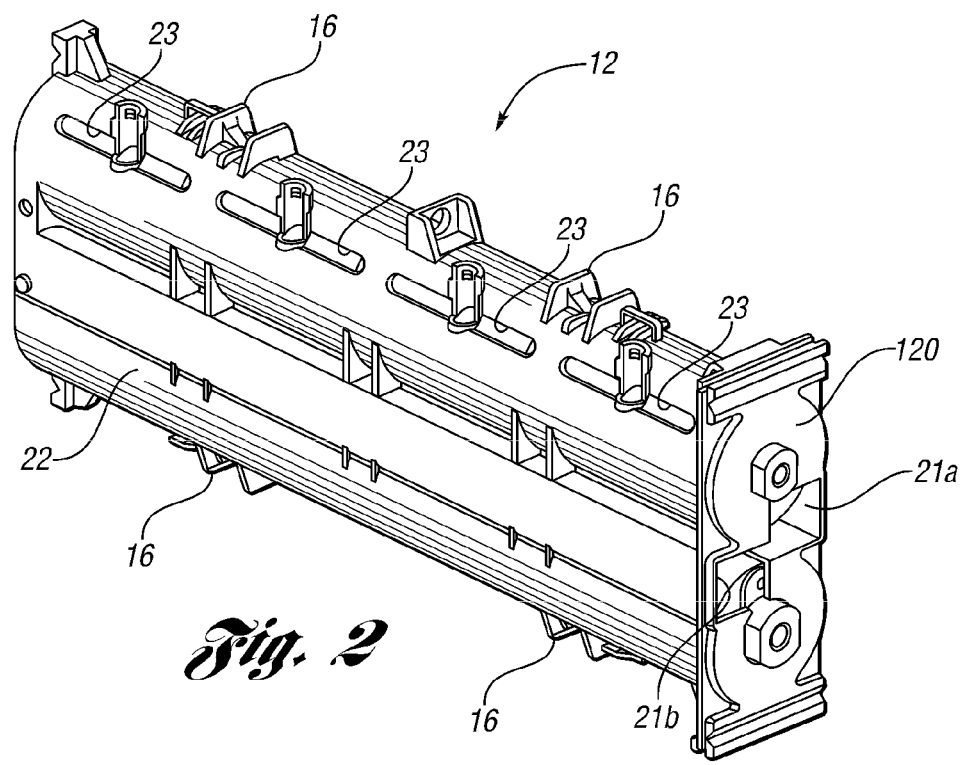
FIG. 2 is an isometric view of a brick, a portion of a battery.

A battery 10, in FIG. 1, has multiple bricks 12 formed into an array. In FIG. 1, an end plate 14 is shown on one end of battery 10. When fully assembled, an end plate is included on the other end of battery 10. Furthermore, there is a cover, not shown in this view, which engages with channels formed between tabs 16. The engagement between the cover and tabs 16 will be discussed in more detail in regards to FIGS. 10-12. A single brick 12 of battery 10 is shown in FIG. 2. Brick 12 includes multiple cells enclosed in a housing 22. Housing 22 also provides access for coolant for the cells via notches 21 and slots 23, with notches 21 providing an entry point and slots 23 providing an exit path, in one embodiment.

Figure 3:
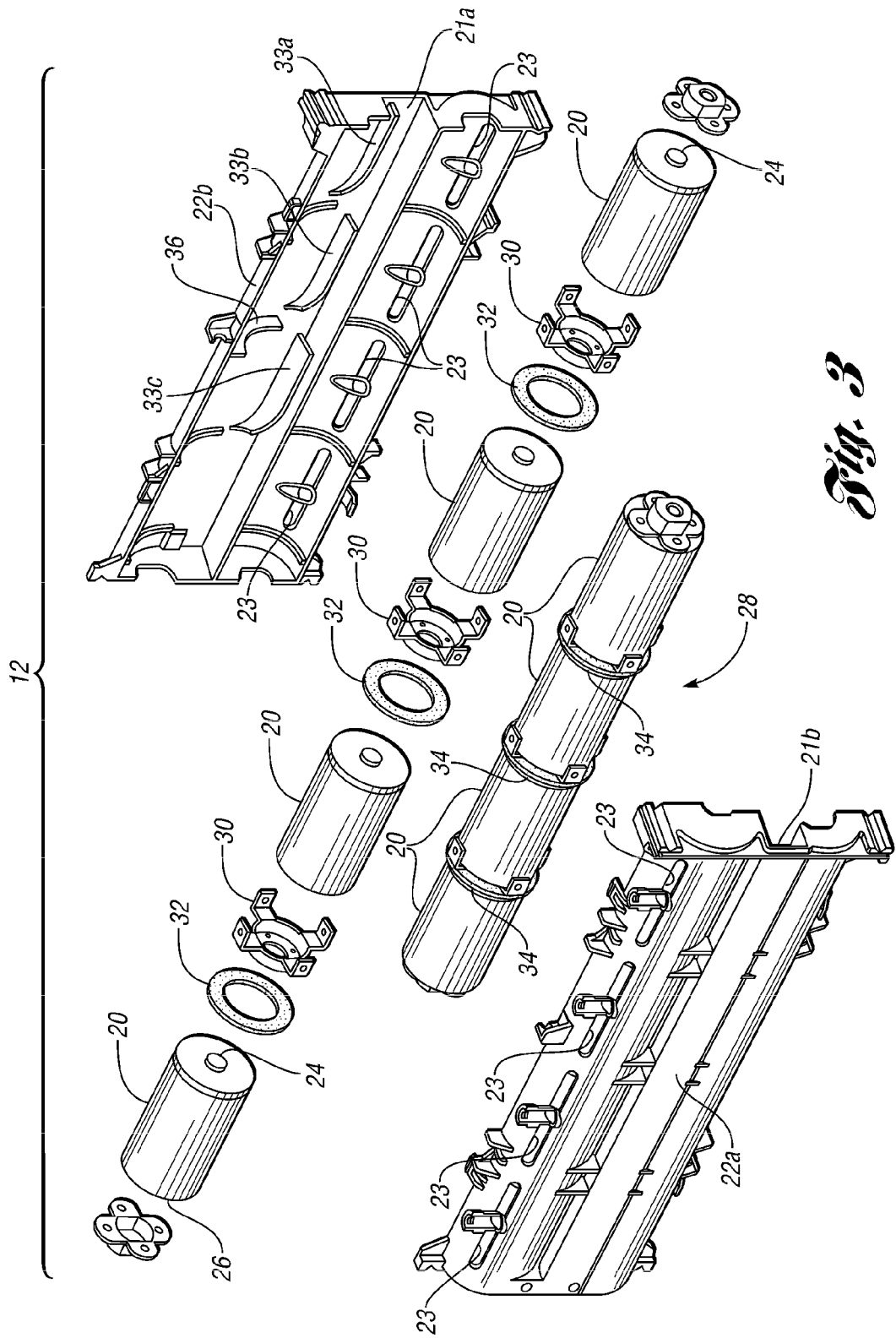
FIG. 3 is an exploded view of a brick showing individual cells.

An exploded view of one embodiment of brick 12, in FIG. 3, has eight cells 20 held within a housing (22 in FIG. 2), as assembled. Housing 22 includes two portions 22a and 22b, which snap together. In FIG. 3, four cells 20 are shown as a cell group 28 and four cells 20 are shown exploded. Each cell 20 has a positive terminal 24 and a negative terminal 26. Cell pairs are coupled longitudinally by interconnector 30, which is welded to the negative terminal 26 of one cell 20 and welded to the positive terminal 24 of an adjacent cell 20. To protect against a negatively-charged portion of one cell 20 from contacting against a positively-charged portion on an adjacent cell 20, an insulator 32 is included in the assembly.

Between pairs of assembled cells 20 is a recess 34. A tab 36, which extends inwardly from housing portion 22b, indexes with recess 34 when housing 22 halves are assembled. Housing portion 22a also has an inwardly extending tab; however, due to the angle at which housing portion 22a is illustrated in FIG. 3, the tab is not visible. Tab 36 is located between the two center cells of a four-cell group. In alternate embodiments, the groups include fewer or greater numbers of cells. In the case of an even number of cells, tab 36 is located between the two center cells. In the case of an odd number of cells, tab 36 is located on one side or the other of the middle cell.

There is stackup tolerance in assembling cell group 28. There can be subtle differences in the lengths of individual cells, the interconnector dimensions, the details of the welds, etc. Although these may be small differences in each individual dimension, the difference in total length between cell groups can be substantial. Tab 36 slides into recess 34 when housing portions 22a and 22b are snapped shut to prevent cell group 28 from sliding longitudinally within housing 22. By indexing at the midpoint of cell group 28, only stackup tolerance from two cells 20 of cell group 28 is accommodated at one end. In this way, the total dimensional variation is accommodated between the two ends rather than falling to one side or the other.

Also shown in FIG. 3 are diverter ribs 33a, 33b, and 33c. At an end of housing portion 22b proximate rib 33a, there is a notched opening 21a through which air, or other coolant, can be provided. To promote distribution of the air to all of the cells, the first rib 33a collects air from the top portion of notched opening 21a and directs it upward toward the cell proximate rib 33a. In FIG. 3, there is no cell shown proximate rib 33a because FIG. 3 is an exploded view. However, one of cells 20 is proximate rib 33a as assembled. Housing portion 22b has no openings along the wall proximate 33a. Thus air directed upward by rib 33a wraps around cell 20 until being expelled from an opening 23 in housing portion 22a (i.e., the portion that mates with portion 22b). Rib 33a extends from the back wall of housing portion 22b and is situated just below the top of notch opening 21a. Thus, only a fraction of the flow into notch 21a is directed toward the cell proximate notch 21a. The rest of the flow that is directed along an underside of rib 33a toward rib 33b. Rib 33b extends from the back wall but is situated lower than rib 33a, so that rib 33b grabs a portion of the air directed along housing 22 and directs it toward an adjacent cell. Similarly, rib 33c, situated even lower, grabs some air. The remaining air is directed toward the cell distally located from notch 21. Because housing portion 22b houses cells 20, the distance at which ribs 33a, 33b, and 33c extend from the back wall is limited. Because rib 33a is closer to the widest part of the cell, it is a narrow rib. Rib 33b can be made a little wider because it is located lower within housing portion 22b. Also, as the ribs angle upward, their width decreases as a function of the amount of upward travel. A notch 21b is provided in housing portion 22a which allows flow into the lower compartment.

Ribs 33a, 33b, and 33c are located in the upper half of housing portion 22b, but are not shown in the lower half of housing portion 22b. Diverter ribs that direct air toward cells installed into the lower compartment of housing 22 are contained in housing portion 22a (not visible in FIG. 3). Flow enters through notch opening 21b and is directed by diverter ribs, which are analogous to diverter ribs 33a, 33b, and 33c, into cells 20 which are housed in the lower compartment of housing 22.

Figure 4:
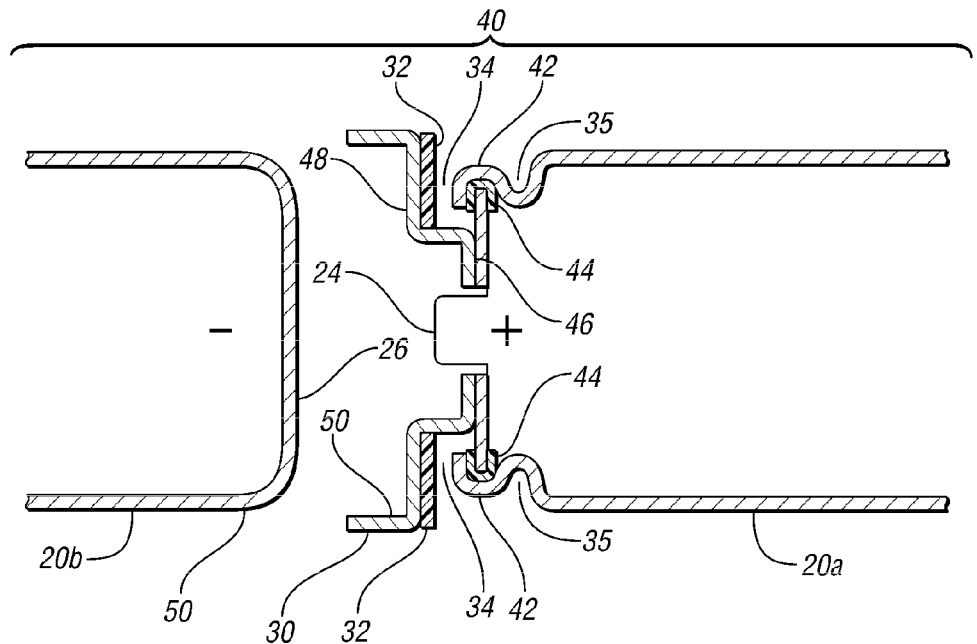
FIG. 4 is a detail of a partially formed connection between two cells.

A detail of the connection system, according to one embodiment, is shown in FIG. 4. A portion of a cell group 40 highlighting the connection system between two cells 20a and 20b, but prior to completely coupling cells 20a and 20b via interconnector 30, is shown in FIG. 4. The end of cell 20a has a crimp joint 42 between positive terminal end 24 and the negatively-charged cylinder case of cell 20a. To avoid a short between the positively-charged end plate and the negatively-charged case, an insulator 44 separates the two within crimp joint 42. Interconnector 30 is shown welded to cell 20a on the plate having positive terminal 24. Insulator 32, shaped like a washer, is placed over interconnector 30 prior to welding on positive terminal 24 at weld joint(s) 46. To complete the assembly, interconnector 30 is welded to cell 20b at surfaces 48 and/or surfaces 50.

A recess 34 between cells is shown in FIG. 4. In one embodiment, tab 36 (shown in FIG. 3) indexes with recess 34. In an alternative embodiment, tab 36 indexes with recess 35 which is associated with crimp joint 42. As shown in FIG. 4, crimp joint 42 is of a slightly smaller diameter than the body of cell 20a. In an alternative embodiment, crimp joint 42 has substantially the same diameter of the body of cell 20a.

Figure 5:
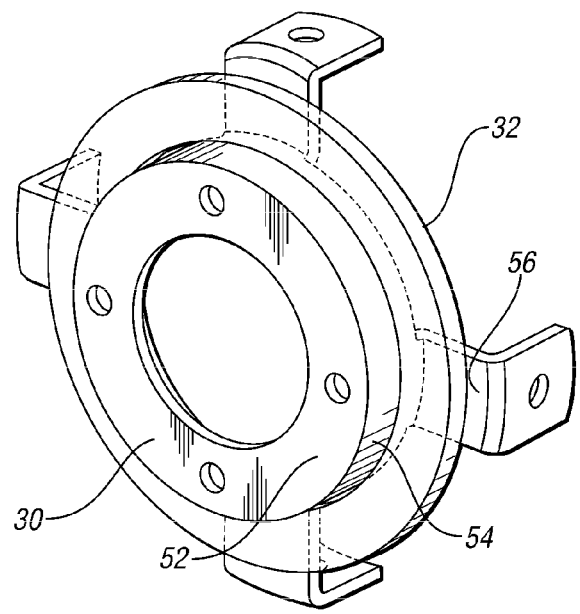
FIG. 5 is an isometric view of a cell interconnector and insulator.

FIG. 5 shows interconnector 30 having an inner ring 52, stand-off portion 54, and tabs 56 extending out radially from stand-off portion 54 for a first length and then extend outwardly axially. Four tabs 56 are shown in FIG. 5, but, the number of tabs can be fewer or greater.

Figure 6:
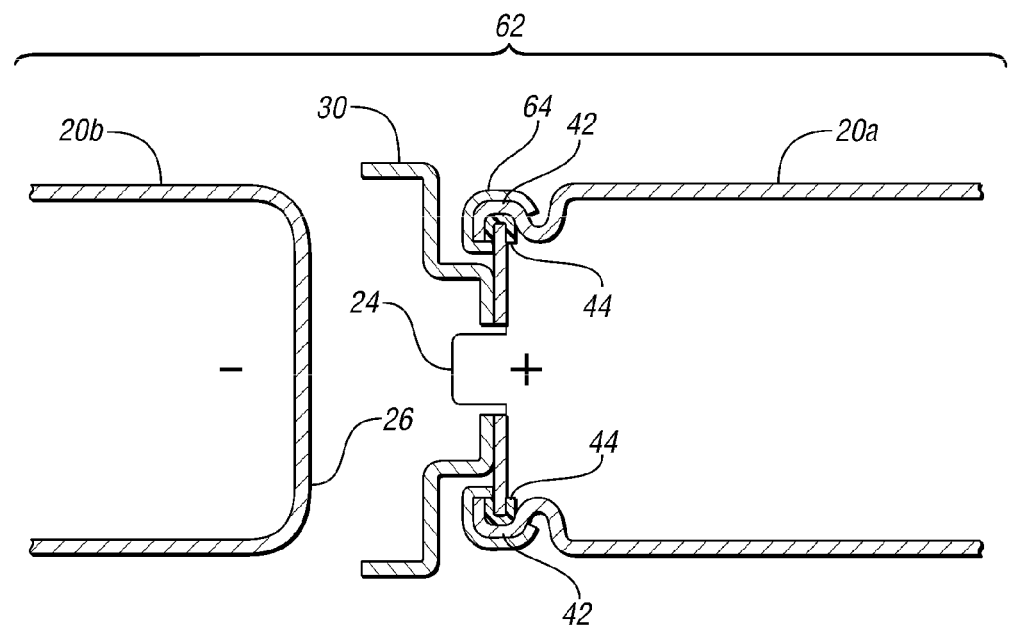
FIG. 6 is a detail of a partially formed connection between two cells.
Figure 7:
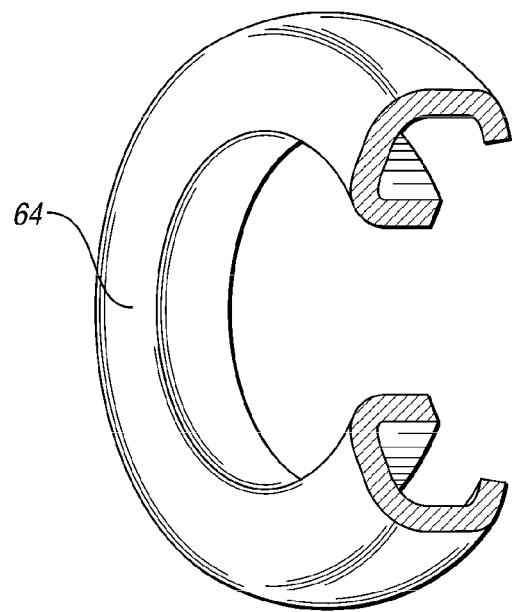
FIG. 7 is an isometric view of a portion of a snap insulator ring.

In FIG. 6, an alternative embodiment shows a portion of a cell group 62 with a snap insulator ring 64 snapped over crimp joint 42. Snap insulator ring 64 prevents a short between interconnector 30 and the negative portion of crimp joint 42. FIG. 6 shows the portion of the cell group 62 in partial assembly, i.e., with interconnector 30 welded to one cell, but prior to being welded to the adjacent cell. The snap insulator ring 64 is shown in an isometric view in FIG. 7.

Insulator 30 of FIGS. 3 and 4 has an inexpensive insulator shape. However, assembly is a bit complicated by having more individual parts that must be assembled at once. Snap insulator ring 64 of FIG. 6 is a more expensive embodiment. However, snap insulator ring 64 can be assembled onto cell 20 prior to welding. Furthermore, snap insulator ring 64 remains in a fixed position on cell 20 after it is snapped into place, thereby facilitating the assembly process. The choice of insulator is application dependent. Both insulator embodiments provide an advantage over insulators that are placed over the case of the cell in that the latter result in a larger diameter cell group. Because battery 10 is made up of many cell groups, even a small increase in outer diameter of a cell group results in battery 10 being significantly larger than necessary.

Figure 8A:
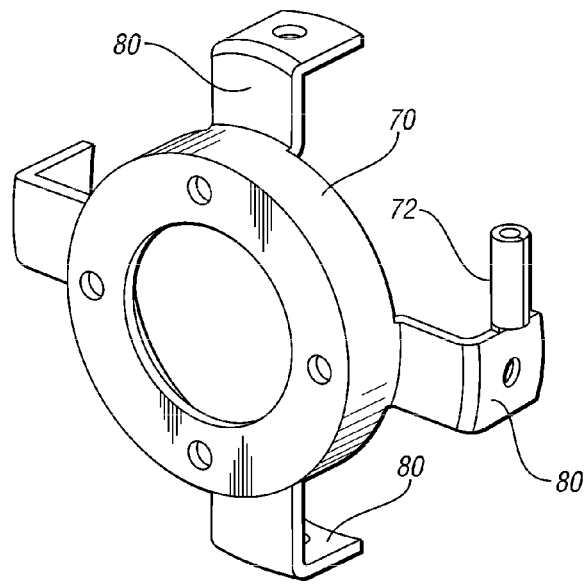
FIG. 8A is an isometric view of an interconnector having a barrel receptacle.
Figure 8B:
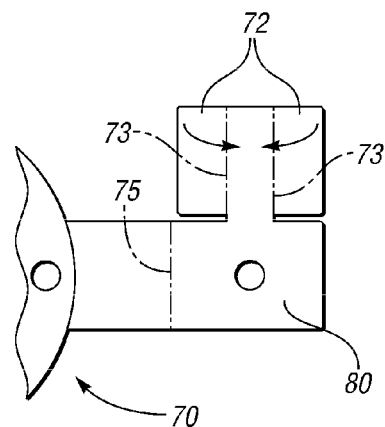
FIG. 8B shows a section of the interconnector prior to forming the barrel receptacle.

In FIG. 8A, an interconnector 70 has a barrel receptacle 72 for insertion of a thermistor. Barrel receptacle 72 can be formed out of the parent material of interconnector 70 and crimped into the barrel shape. In one embodiment, interconnector 70 is formed from a flat piece of material, a portion of which is shown in FIG. 8B. A portion of a round portion of interconnector 70 is shown with tab 80. To form interconnector 70, tab 80 is bent backwards at bend location 75. Barrel receptacle 72 is formed by bending the material forward at bends 73.

Figure 9A:
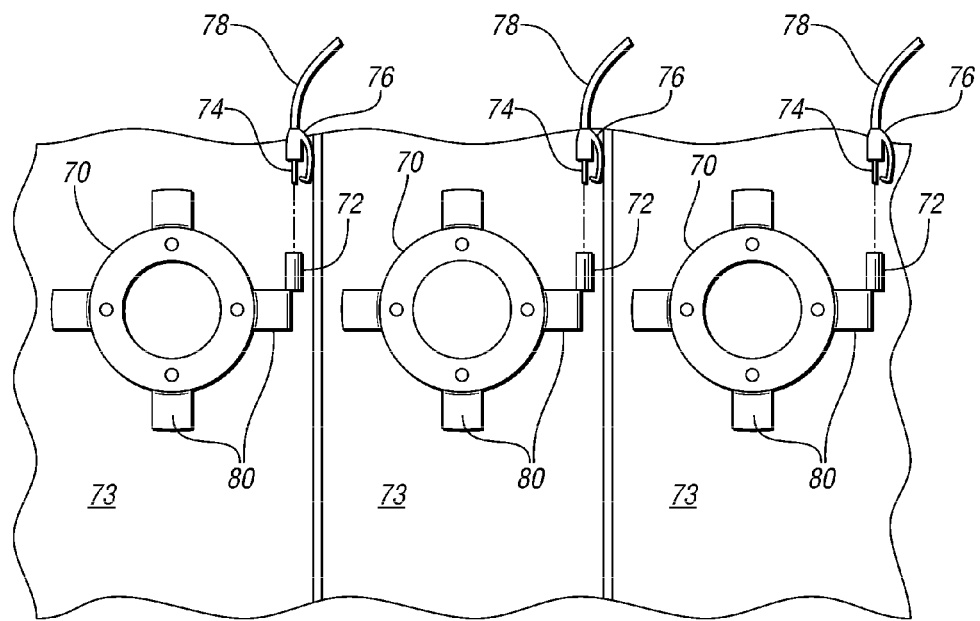
FIG. 9A is an end view of multiple battery bricks showing a barrel receptacle for a thermistor with a thermistor installed.

In FIG. 9A, portions of bricks 73 showing the interconnectors 70 have barrel receptacles 72. A thermistor 74 can be installed into barrel receptacle 72. Thermistor 74 is coupled to leads 78 which are coupled to a device for determining the temperature corresponding to a reading from thermistor 74. Thermistor 74 can have a connector 76 with a clip lock to hold thermistor 74 in place in interconnector 70.

Figure 9B:
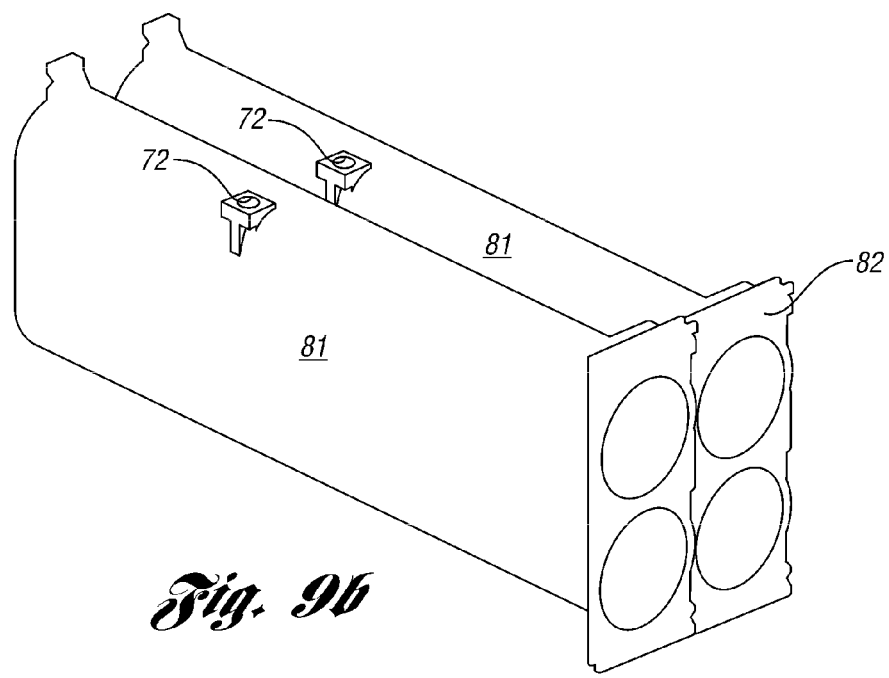
FIG. 9B is an isometric view of two bricks showing a holder for the thermistor.
Figure 9C:
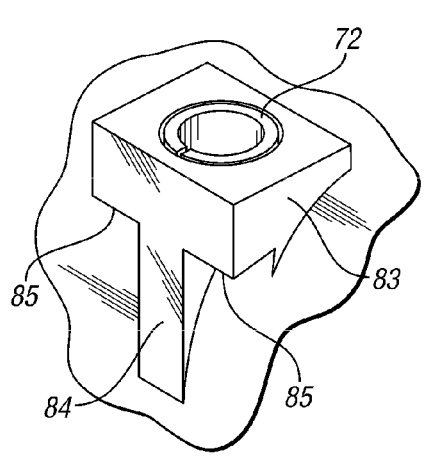
FIG. 9C is a detail of the holder of FIG. 9B.
Figure 9D:
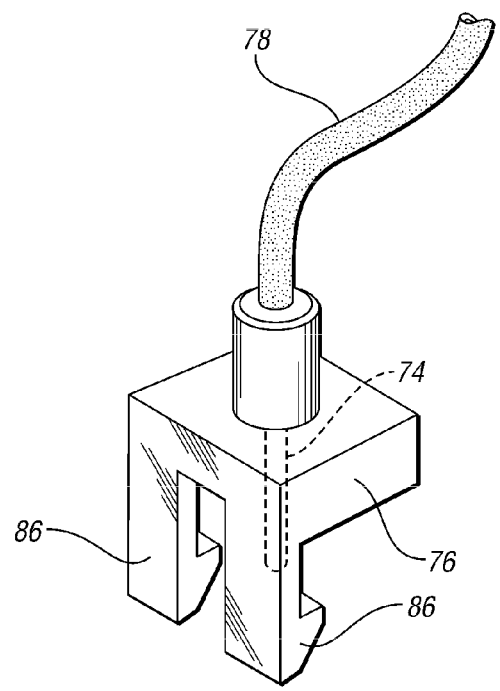
FIG. 9D is a detail of a connector for the thermistor.

In FIG. 9B, an exterior view of two brick housings 81 are shown with a front cover 82. Molded into housings 81 are holders 83. Holders 83 mate with barrel receptacles 72 (only the upper tips of barrel receptacles 72 are visible in FIG. 9B.) A detail of holders 83 are shown in FIG. 9C. Holder 84 is coupled to housing 81 with a rib 84 extending out of housing 81 as a support member. The holder 83 has undercuts 85, which engage with legs 86 of connector 76 coupled to thermistor 78, as shown in FIG. 9D.

Thermistor 74 provides an estimate of cell 20 temperature. The highest temperatures occur within cells 20 and in current-carrying tabs 80. It would be desirable, but not possible, to measure the internal cell temperature. As temperature of tabs 80 mimics the temperature inside cells 20, tab temperature, as measured by thermistor 74, is a good indication of internal cell temperature. The location of barrel receptacle 72 is arranged so that thermistor 74 can be inserted after brick 73 is assembled.

Figure 10:
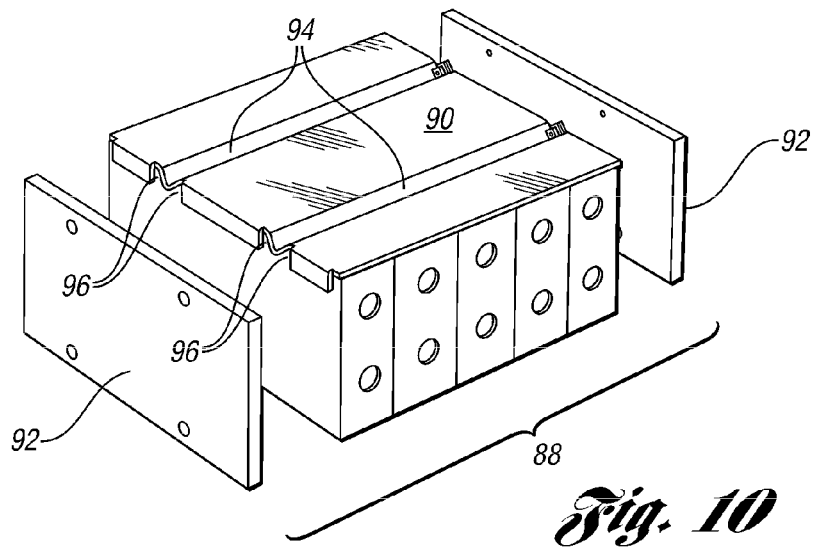
FIG. 10 is an isometric view of a battery, partially exploded, showing a cover, according to an embodiment of the disclosure.
Figure 11:
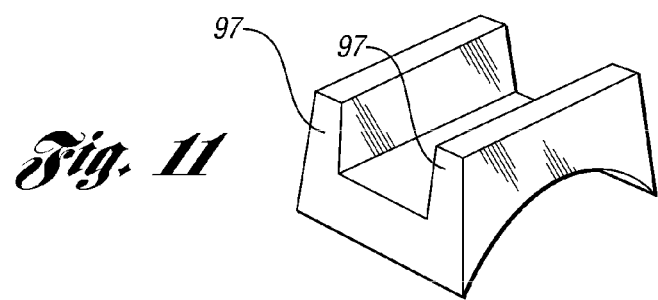
FIG. 11 is an alternative tab structure, according to an embodiment of the disclosure.

In FIG. 1, battery 10 has channels 16. In FIG. 10, a partially-exploded view of battery 88 shows a cover 90 and end plates 92. Cover 90 has V-shaped grooves 94 which engage with V-shaped channels formed between tabs 96. The V shape is merely one example. The channels in the cover can be square at the bottom, as shown in FIG. 11, to mate with tabs 97 having vertical sides. Other suitable alternatives include any other shape that can be used to hold the cover into the channels.

Figure 12A:
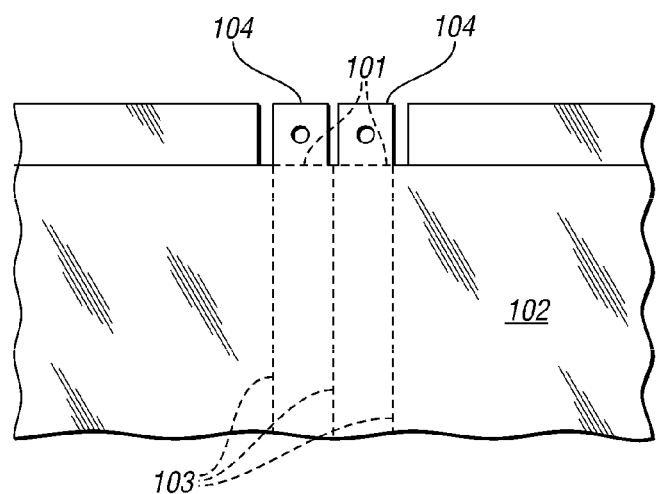
FIG. 12A is a portion of a battery cover prior to being bent into shape.
Figure 12B:
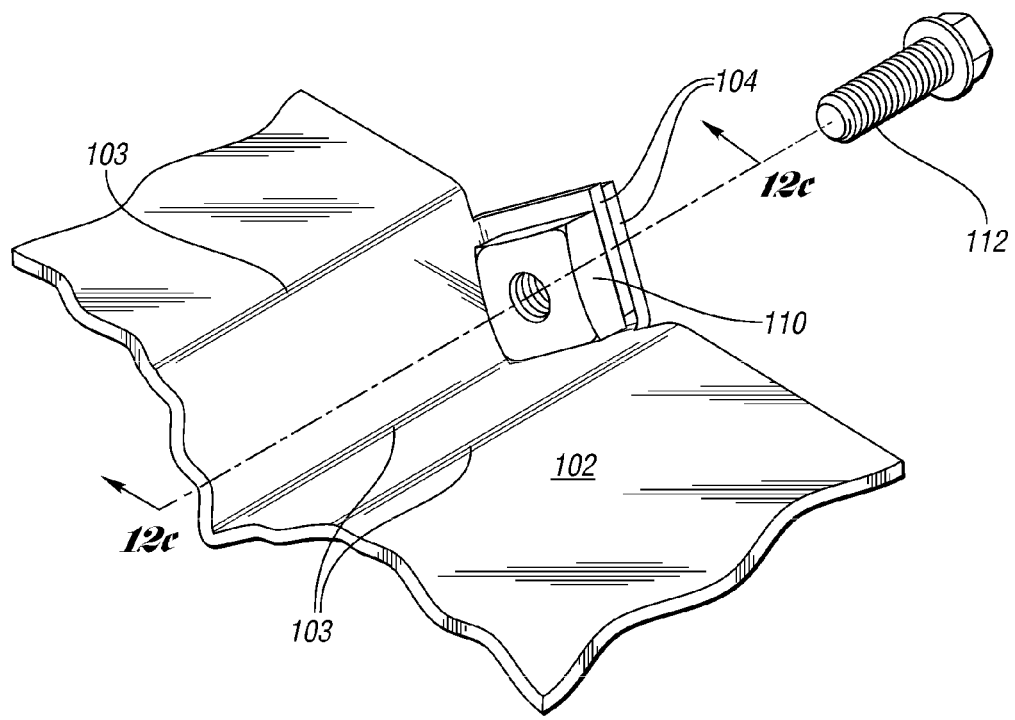
FIG. 12B is an isometric view of a portion of the battery cover.
Figure 12C:
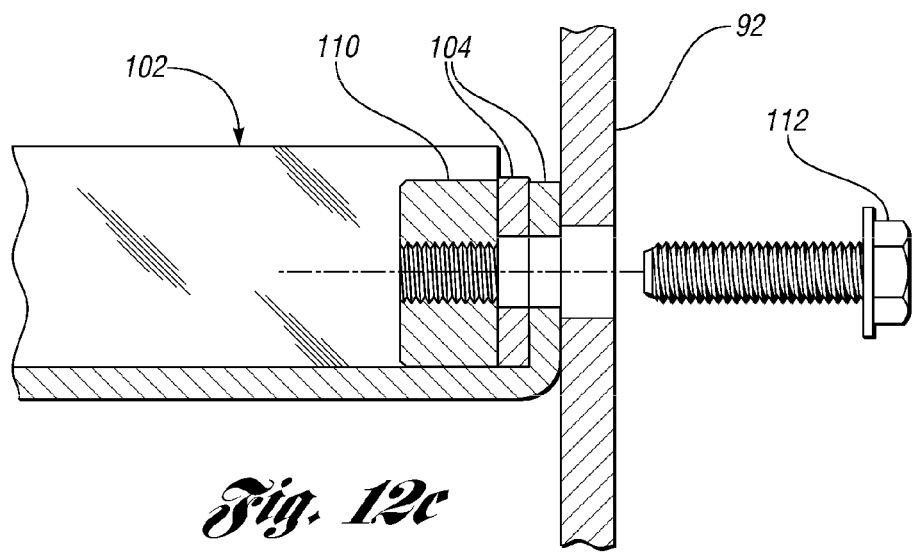
FIG. 12C is a cross section of the cover and the end plate of the battery assembly.

FIG. 12A shows a portion of cover 102 for the battery. In FIG. 12A, cover 102 is shown prior to being folded, i.e., as a flat piece. Cover 102 is to be folded along bend lines 103 to form a groove with the middle of the bend lines forming the tip of the vee. Tabs 104 are bent forward along bend lines 101. A portion of the resulting cover is shown in FIG. 12B. A square nut is places into the groove formed at bends 103. Tabs 104, due to bends 103, overlap each other. A threaded fastener 112 can engage with nut 110. A cross-section of a portion of cover 102 is shown in FIG. 12C. End plate 100 of the battery is coupled to cover 102 when threaded fastener 112 is coupled with nut 110.

In one embodiment, nut 110 is held in place by crimping at least one of tabs 104 around nut 110.

While the best mode has been described in detail, those familiar with the art will recognize various alternative designs and embodiments within the scope of the following claims. Where one or more embodiments have been described as providing advantages or being preferred over other embodiments and/or over prior art in regard to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. The embodiments described as being less desirable relative to other embodiments with respect to one or more characteristics are not outside the scope of the disclosure as claimed.

What is claimed is:

1. A housing for cells, comprising:
    a first compartment having a first axis;
    a second compartment having a second axis generally parallel with the first axis; and
    a plurality of diverter ribs disposed in and extending into the first compartment, the diverter ribs configured to direct flow into the first compartment; and
    an opening in an end of the housing for allowing a coolant to flow into the first and second compartments wherein the flow enters the housing generally parallel to the first and second axes,
    wherein the diverter rib closest to the opening is narrower than the diverter rib farthest away from the opening.

2. The housing of claim 1 wherein the first compartment is configured to receive a first cell assembly, the second compartment is configured to receive a second cell assembly, the first cell assembly comprises a plurality of cells mechanically coupled longitudinally, and the second cell assembly comprises a plurality of cells mechanically coupled longitudinally.

3. The housing of claim 2, further comprising:
    a plurality of diverter ribs disposed in the second compartment, wherein diverter ribs in the first compartment direct flow toward the plurality of cells associated with the first cell assembly and diverter ribs in the second compartment direct flow toward the plurality of cells associated with the second cell assembly.

4. The housing of claim 3 wherein the number of diverter ribs directing flow toward the plurality of cells associated with the first cell assembly is at least the number of cells in the first cell assembly minus one.

5. The housing of claim 3 wherein the diverter ribs are configured to provide an approximately equal flow quantity directed toward each cell in the first and second cell assemblies.

6. The housing of claim 3 wherein the diverter ribs and the housing are a unitary construction with the diverter ribs extending inwardly from an inside tubular surface of the first and second compartments.

7. The housing of claim 1, further comprising:
an outlet configured to allow flow to exit the first compartment, wherein the outlet is defined in a wall of the first compartment, wherein the wall is generally parallel with the first axis.

8. A battery, comprising:
a first group of cells coupled longitudinally;
a second group of cells coupled longitudinally; and
a housing having:
a first compartment into which the first group of cells are placed;
a second compartment into which the second group of cells are placed;
an opening in an end of the housing; and
diverter ribs extending into the first compartment from an inside surface to direct flow toward first compartment cells from the opening,
wherein the diverter rib closest to the opening is narrower than the diverter rib farthest away from the opening.

9. The battery of claim 8, wherein the housing further has diverter ribs disposed in the second compartment to direct flow toward second compartment cells.

10. The battery of claim 9 wherein the opening is configured to introduce flow into the compartments approximately parallel with the first and second groups of cells, and the diverter ribs in the first compartment turn the flow toward cells associated with the first group of cells and the diverter ribs in the second compartment turn the flow toward cells associated with the second group of cells.

11. The battery of claim 8 wherein the first group comprises four cells, the second group comprises four cells, and the first compartment has three ribs directing flow toward the first group of cells and the second compartment has three ribs directing flow toward the second group of cells.

12. The battery of claim 11 wherein the diverter ribs are configured so that an approximately equal flow is provided to each cell in the battery.

13. The battery of claim 8 wherein the cells are generally cylindrical and the first and second compartments are generally tube shaped.

14. The battery of claim 8 wherein a number of diverter ribs disposed in the first compartment is one less than a number of cells in the first group.

15. The battery of claim 14 wherein a diverter rib proximate the opening in the compartment directs flow to a cell located proximate the opening.

16. A battery, comprising:
a first group of cells coupled longitudinally;
a second group of cells coupled longitudinally;
a housing having:
a first compartment into which the first group of cells are placed;
a second compartment into which the second group of cells are placed;
a first plurality of diverter ribs extending from an inside surface of the first compartment, the first diverter ribs configured to direct flow into the first compartment; and
a second plurality of diverter ribs disposed extending from an inside surface the second compartment, the second diverter ribs configured to direct flow into the second compartment; and
an opening in an end of the housing for allowing a coolant to flow into the first and second compartments,
wherein the diverter rib closest to the opening is narrower than the diverter rib farthest away from the opening.

17. The battery of claim 16 wherein the housing is comprised of two interlocking portions with the first plurality of diverter ribs integrated into a first of the two portions and the second plurality of diverter ribs integrated into a second of the two portions.

18. The battery of claim 16, further comprising:
an opening in a first end of the housing, the opening configured to permit coolant flow to enter the first compartment; and
an outlet in a longitudinal wall of the first compartment, the outlet configured to permit the coolant flow to exit the first compartment.

* * * * *